May 8, 1962 P. P. LOVE 3,033,313
LUBRICATION OF PLAIN BEARINGS IN MACHINERY
SUBJECT TO CYCLIC LOADING
Filed Feb. 19, 1960 11 Sheets-Sheet 1

FIG. 1.

INVENTOR
PHIL P. LOVE
BY
Pierce, Schiffler & Parker
ATTORNEYS

P. P. LOVE 3,033,313

LUBRICATION OF PLAIN BEARINGS IN MACHINERY
SUBJECT TO CYCLIC LOADING

Filed Feb. 19, 1960

INVENTOR
PHIL P. LOVE

BY
Pierce, Scheffler & Parker
ATTORNEYS

INVENTOR
PHIL P. LOVE

May 8, 1962 P. P. LOVE 3,033,313
LUBRICATION OF PLAIN BEARINGS IN MACHINERY
SUBJECT TO CYCLIC LOADING
Filed Feb. 19, 1960 11 Sheets-Sheet 7

INVENTOR
PHIL P. LOVE

BY
Pierce, Scheffler & Parker
ATTORNEYS

`3,033,313`
LUBRICATION OF PLAIN BEARINGS IN MACHINERY SUBJECT TO CYCLIC LOADING
Phil Prince Love, Wembley, England, assignor to The Glacier Metal Company Limited, Wembley, England, a company of Great Britain
Filed Feb. 19, 1960, Ser. No. 9,739
Claims priority, application Great Britain Mar. 5, 1959
28 Claims. (Cl. 184—6)

This invention relates to the lubrication of bearings in machinery, particularly to bearings which are subject to heavy cyclic fluctuating loads. Such conditions exists in the main and big end bearings of reciprocating internal combustion engine and compressors and also in machines such as stone crushers, presses, screening machines and the like.

Hitherto it has been the practice to provide lubricating oil to oil bearings in the machine at substantially constant pressure from a main gallery, and in the case of crankshaft and connecting rod machines oil is normally delivered to the main bearings and thence via grooves and/or recesses in the bearing and passages in the crankshaft from the main journal to the crankpin and thence to the big end bearing.

It has been discovered that where large changes in magniture and/or relative angular velocity of the load applied to the bearing occur, the bearings will require oil at varying rates according to the nature of the applied load, and with conventional oil supply systems delivering oil at pressures which do not usually exceed 100 lbs. per square inch insufficient oil is admitted for efficient operation of the bearing during the period of peak load. What indeed happens in these circumstances is for air to be drawn into the bearings and the oil film becomes discontinuous and is unable, without imposing severe transient stresses on the bearing material, to sustain the high loads which are imposed on the bearing.

If, to overcome this disadvantage the pressure of the oil supply is simply increased the rate of oil circulation and the power required to drive the oil pump would be increased to unacceptable values.

Moreover, in a machine having a plurality of bearings subject to heavy cyclic loads, e.g. a multicylindered diesel engine, the distribution of oil from the main gallery is determined not by the essential needs of the bearings but by fortuitous factors, such as, various clearances within manufacturing and assembly tolerances, restrictions in the pipe work, inter-action of demands of the various bearings, which are relatively unimportant. Thus a bearing assembled fortuitously with a large clearance will tend to run cooler than a bearing assembled fortuitously with a small clearance and at the same time will receive more oil than the latter, whereas the latter requires at least as much oil as the former if the danger of over-heating is to be eliminated.

It is an object of the present invention to provide an improved lubricating system which will at least mitigate the above.

A lubricating system for a machine having at least one plain bearing subject to a cyclic fluctuating load according to the present invention comprises means for supplying to the bearing an oil "slug" of a determined value of at least one determined period in the load cycle, the expression "oil slug of a determined value" being interpreted as a meaning a quantity of oil by mass or volume which is substantially independent of and unaffected by uncontrolled operating conditions in the machine, that is to say operating conditions which may change without the action of any control member and/or operating conditions changes in which are not used to control the mass or volume of the "slug."

I am aware that it has been proposed to lubricate two flat bearing surfaces having relative rotary movement about a common axis normal to the planes in which they lie by supplying oil continuously to one or more grooves between the surfaces from a source of oil pressure, and also to deliver to the surfaces through another groove at periodic intervals a pulse of oil by connecting a storage chamber alternatively to a source of oil at high pressure and to the said groove so that the pulse is delivered by reason of the expansion of the oil previously compressed in the storage chamber. In such prior proposal the pulses were delivered at intervals of time which were determined by a belt-driven valve and the pulses were not, therefore, delivered at any determined point in the cycle of rotation of the bearing surfaces while, moreover, the value of each pulse varied in an indeterminate manner with variations in the oil pressure which existed between the bearing surfaces at any moment and also with variations in temperature.

In most cases in a lubricating system according to the present invention the means for delivering the slugs of oil will be such that the volume or mass of the slug of oil will remain constant irrespective of changes in operating conditions. In some cases, however, the volume or mass might be changed automatically in accordance with a predetermined law with changes in one or more operating conditions.

The delivery period of the oil slug is preferably timed to begin up to 90° of rotation of the journal within the bearing prior to reduction of the angular velocity of the load vector in the direction of rotation of the journal relative to the bearing and to be sustained until either the angular velocity of the load vector in the direction of rotation of the journal relative to the bearing begins to rise or until the onset of peak load. The onset of peak load may be defined as the instant when the load rises to within 80% of an absolute peak.

It should be noted that the angular velocity of the load vector should be treated as an algebraic quantity positively in the direction of rotation of the journal within the bearing so that the expression "reduction of the angular velocity of the load vector" includes the instance of an increase in angular velocity of the vector in a direction contrary to the direction of rotation of the journal within the bearing.

In the simple case of one reduction in angular velocity of load vector relative to rotation of journal within the bearing followed by a peak load the delivery of the oil slug is suitably timed to occur within a period which does not exceed 180° of rotation of the journal relative to the bearing in advance of the onset of the peak load.

Where during the load cycle there is more than one period in which the angular velocity of the load vector is reduced substantially in the direction of rotation of the journal within the bearing then more than one slug of oil is delivered timed to begin shortly prior to each reduction of angular velocity referred to and to be sustained until either the angular velocity in direction of rotation of the journal begins to rise or until the onset of a peak load. The delivery of the oil slug is suitably timed to occur within a period not exceeding 180° of rotation of the journal in relation to the bearing in advance of the peak load or, where no peak load follows reduction of angular velocity of the load vector the delivery of the oil slug is suitably timed to occur during a period ending at not exceeding 120° of rotation of the journal after the onset of reduction of angular velocity of the load vector in the direction of rotation of the journal within the bearing.

Where, during the load cycle there is little or no substantial change of angular velocity of the load vector then the delivery of the oil is preferably timed to occur within a period in the load cycle which does not exceed 180° of rotation of the journal relative to the bearing in advance of the onset of peak load.

It should be noted that there may be instances where during the load cycle the angular velocity of the journal relative to the bearing varies cyclically by sufficient amplitude as to result in a reduction of the angular velocity of the load vector relative to the rotation of the journal within the bearing even although the absolute angular velocity of the load vector considered as an entity gives no indication of the situation.

According to a preferred feature of the invention the volume of the oil slug is V calculated from the formula $$V = b \cdot d \cdot c \cdot e \cdot k$$

where $b$ is the length of the bearing
$d$ is the diameter (bore diameter)
$c$ is the diametral clearance (difference between bore diameter of bearing and diameter of journal)
$e$ is the eccentricity ratio of the journal within the bearing as when operating at a steady load W as defined below, and
$k$ is a "duration" factor as defined below.

Where the duration of reduction of angular velocity of the load vector in the direction of rotation of the journal within the bearing extends over $\alpha$ radians of journal angular rotation within the bearing and is followed by the peak load, the value of which is given to W for the calculation of the eccentricity ratio $e$, then $k$ should be taken as $\sqrt{\alpha}$.

Where the reduction in angular velocity of the load vector is not followed by a significant peak load, i.e. a peak load greater than the mean load over the cycle, then the means load over the cycle is given to W for the calculation of the eccentricity ratio $e$, and $k$ should be taken as $\sqrt{\alpha}$.

Values of $k$ may be less than $\sqrt{\alpha}$ but to the extent approximately to which this value is reached so the benefit of the invention will be achieved. Broadly speaking the value of $k$ should not be less than ⅔ of $\sqrt{\alpha}$.

Where it is difficult or inconvenient to determine $e$ or where a first approximation is required for a single slug per cycle the volume of the slug may be calculated as not less than $$0.4 \, b \cdot d \cdot c$$

For the calculation of $e$ the design procedure described by Burke and Neale and appended to their paper "A Method of Designing Plain Journal Bearings for Steady Loads"—Institute of Mechanical Engineers International Conference on Lubrication and Wear, October 1957—may be used.

The oil slug V is intended primarily to produce the necessary conditions during the peak load, but it may be desirable to supply oil under normal gallery pressure to the bearing at other times.

Thus according to another preferred feature of the invention the system includes means for supplying oil to the bearing or bearings at a relatively low constant pressure during at least part of the remainder of the cycle.

According to another aspect of the invention in a lubricating system for a machine having a multiplicity of plain bearings subject to cyclic fluctuating loads, and in which the peak load on one bearing is transmitted to or substantially reflected on one or more other bearings then these bearings are considered and treated as a group and the lubricating system is arranged to deliver slugs of oil simultaneously to all the bearings in one group, the slugs being timed to occur during the specified period or periods in the cycle relative to reductions in the angular velocity of the load vector in the direction of rotation of the shafts within the bearings particularly in advance of the onset of peak load on each of the bearings in that group.

The oil supply to each group may be arranged in series from one bearing to the next, or may be supplied in parallel, according to convenience.

A typical example of what tends to happen in plain bearings subject to a cyclic fluctuating load with existing lubricating systems, six diagrammatic examples of the invention and various graphic examples are shown in the accompanying drawings, in which:

FIGURE 11 is a conversion graph hereinafter referred to, and FIGURES 12, 13 and 14 are typical polar load diagrams hereinafter referred to.

Figure 1:
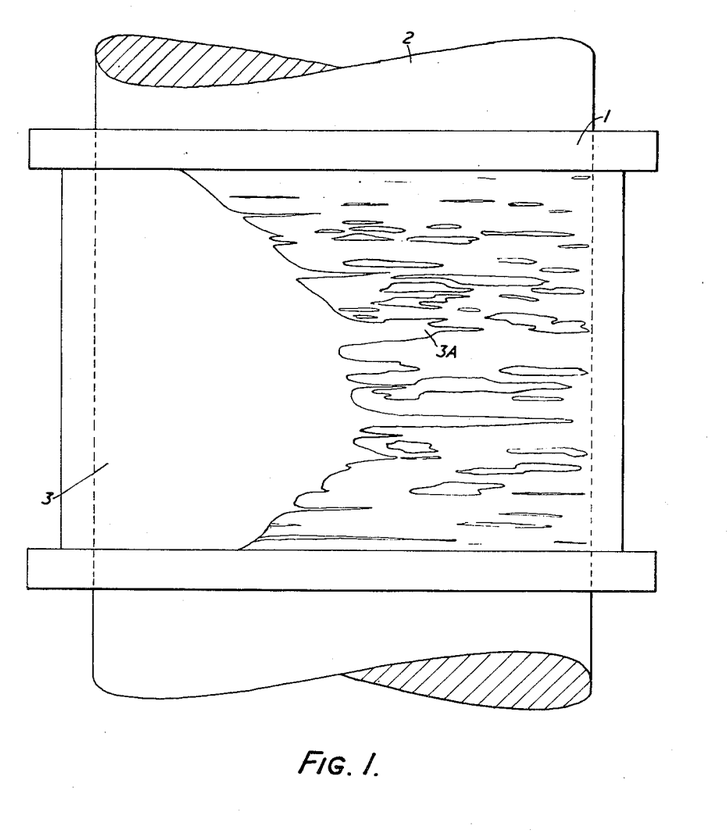
FIGURE 1 is a representation of a view through a transparent bearing.
Figure 1A:
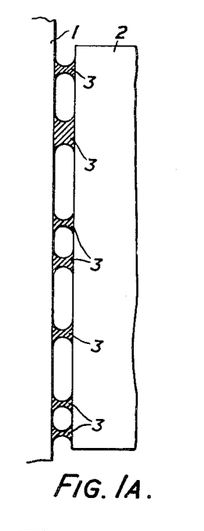
FIGURES 1A to 1D are diagrammatic sectional views through a journal in a bearing at a series of points in the load cycle, as hereinafter explained.
Figure 1B:
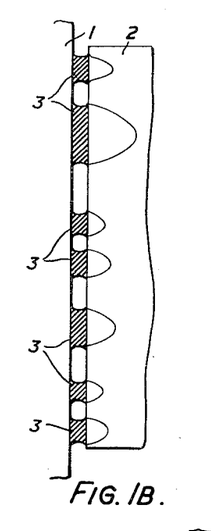
Figure 1C:
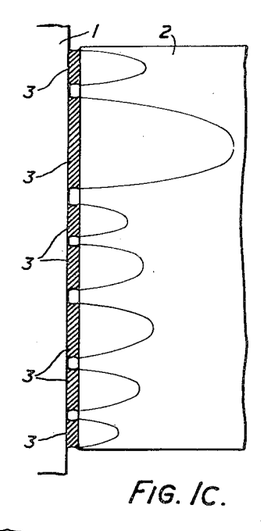
Figure 1D:
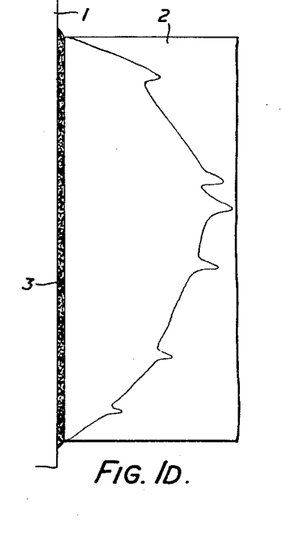
Figure 1E:
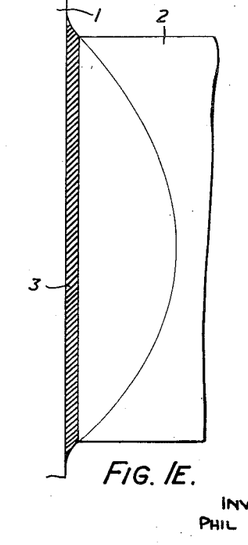
FIGURE 1E is a similar view to FIGURES 1A to 1D showing the desirable condition of maximum load carrying.

Referring to FIGURE 1, 1 is the transparent bearing of a bearing lubrication research machine in which is mounted to rotate the shaft 2 to which a cyclic fluctuating load is applied and it will be seen that the oil film generally indicated at 3 is discontinuous in the region 3A. Tests with such a transparent bearing have shown the oil film where it is discontinuous as at 3A collapses with impact when the load reverses rapidly, as it does for example in the big end connecting rod bearing of a reciprocating four-stroke internal combustion engine towards the end of the compression stroke. FIGURES 1A to 1D are diagrams derived from data obtained with the abovementioned machine, showing diagrammatically how when the load is applied at the region 3A of FIGURE 1 the ligaments of oil spread and develop transient pressure patterns with gradients considerably in excess of that which would obtain in a continuous film such as that indicated at 1E which will carry the required load satisfactorily. It will be apparent from a consideration of FIGURES 1A, 1B and 1C with FIGURE 1D, which shows the almost instantaneous situation just when the cavities in the oil film have collapsed, that peaks of shock pressure must exist when the various fronts of the oil film meet and are brought to an almost instantaneous standstill. As pointed out above if, to overcome this disadvantage, the pressure of oil supply to the bearing is simply increased to the required degree, the rate of oil circulation and the power to drive the oil pump would both be increased to a generally unacceptable value.

Figure 2:
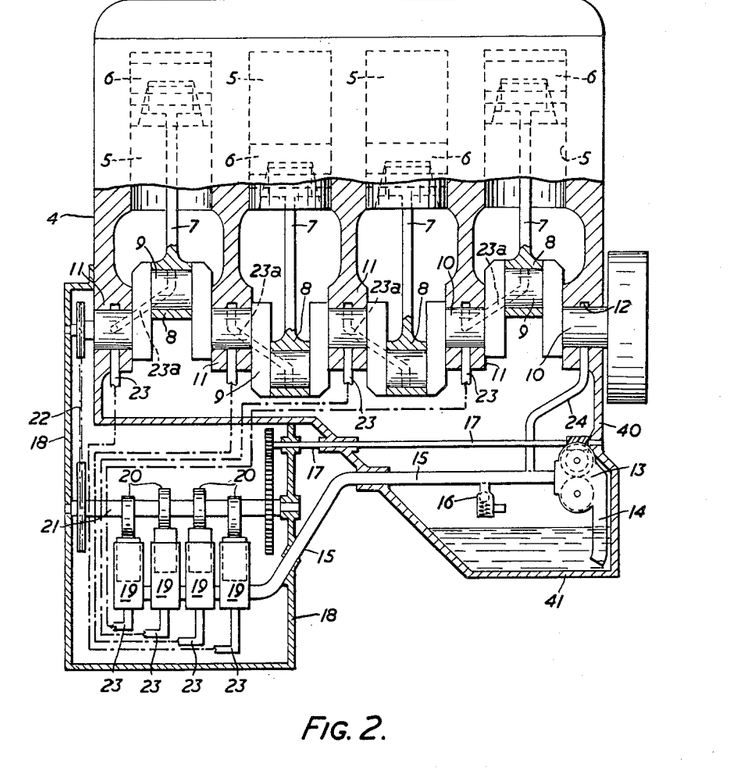
FIGURE 2 is a diagrammatic view of a four cylinder internal combustion engine incorporating one example of the invention.
Figure 3:
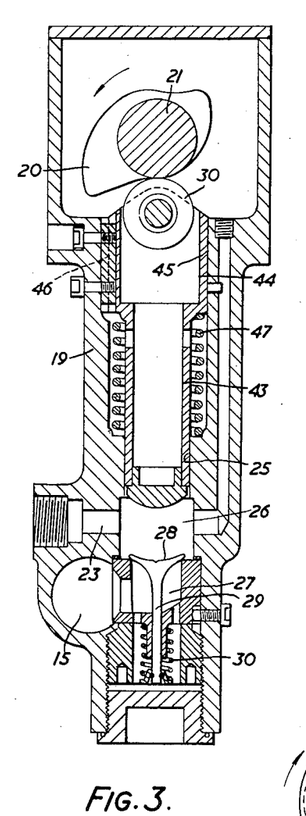
FIGURE 3 is an enlarged cross sectional view of one of the plunger type pumps used in the engine shown in FIGURE 2.

In the example of an application of the invention shown diagrammatically in FIGURES 2 and 3, as applied to an internal combustion engine, the engine is of the four cylinder type and comprises a cylinder block, indicated at 4, containing four cylinders 5 each containing a piston, indicated at 6, connected by a connecting rod 7 having a big end bearing 8 to one end of the crank pins 9 of a crankshaft 10 which is supported in main bearings 11, 12, carried by the cylinder block, all in a generally known manner. Also in conventional manner, the cylinder block is rigidly attached to a crankcase 40 provided with the usual oil sump 41 from which during operation lubricating oil is drawn and delivered to the bearings.

Arranged within the oil sump is a rotary oil pump 13 arranged during operation, to draw oil continuously through an inlet passage conduit 14 from the sump and deliver it to a delivery passage conduit 15 provided with a spring pressed relief valve indicated at 16 through which surplus oil is returned to the sump and by which a substantially constant pressure is thus normally maintained in the delivery passage 15, all also in generally known and conventional manner.

In the arrangement diagrammatically shown the oil pump 13 is shown for convenience as driven from one end of a driving shaft 17, the other end of which lies within a casing 18 containing four positive displacement type plunger pumps indicated at 19, the plungers of which are operated by cams 20 on a cam shaft 21 which is positively driven at half crankshaft speed from the crankshaft 10 through a chain or train of gearing indicated at 22.

The delivery passage communicates directly with the inlet passages of the pumps 19 while the discharge passages 23 of the pumps are arranged to deliver oil respectively to circumferential grooves in the four main bearings 11 as shown from each of which grooves leads an oil feed passage 23a for supplying oil to the associated big end bearing 8. The main bearing 12 is connected by an oil passage 24 directly to the delivery passage 15. Alternatively an additional plunger pump 19 can be provided for the main bearing 12.

Each of the pumps 19 is constructed and arranged as shown in FIGURE 3 from which it will be seen that the pump casing is formed internally to provide a cylinder bore 25 opening at its lower into a chamber 26. The chamber 26 communicates at its end opposite the bore 25, with an inlet port 27 leading from the delivery passage 15 and also communicates with the discharge 23 of the pump. The inlet port 27 is controlled by a poppet type non-return valve 28 having its stem 29 supported in a guide and acted upon a light spring 30 tending always to close the valve. The characteristics of the spring 30 are such that it cannot maintain the valve 28 closed against the pressure normally maintained in the passage 15 by the pump 13 and relief valve 16 under conditions in which back pressure in the chamber 26 is low.

Arranged to reciprocate in the bore 25 is the lower end portion of a plunger assembly including a piston part 43 rigidly secured to a cross head part 44 which is mounted to slide in a guide part 45 with anti rotation key 46 in the casing, is acted upon a compression spring 47 and carries a roller 30 acted upon by the associated cam 20 and maintained in engagement with it by the spring 47.

The cam 20 is formed with two lobes, as shown so that the plunger will perform two complete reciprocations for each revolution of the cam shaft 21, that is to say for each load cycle of the bearings on the crank shaft 10. The form of the cam 20 is moreover such, as shown that the plunger is caused to perform each delivery stroke during an angular rotation of the cam shaft which is small as compared with that during which the plunger performs each "suction" stroke.

It will be apparent that with the arrangement shown in FIGURES 2 and 3, lubricating oil will be delivered continuously to the main bearing 12 at the pressure maintained in the passage 15 and, during the suction stroke of each of the pumps 19 will be similarly delivered to the main bearings 11 through the inlet valves 28 and the passages 23. When however, a plunger 43 performs its delivery stroke the increase in pressure thus caused in its chamber 26 will cause the inlet valve 28 to close so that a "slug" of oil of a volume determined by the diameter and stroke of the plunger 43 will be forced at increased pressure through the discharge passage 23 of the pump concerned to the associated main bearing and its associated big end bearing. The appropriate period during which such a slug of oil is delivered in systems according to the invention will be determined in accordance with the general information given above. Thus assuming the engine shown to operate upon the four stroke cycle, each of the main bearings which may be regarded as operating on the four stroke cycle during operation is subject to a cyclic fluctuating load having two peaks namely a main peak which occurs at approximately the end of the compression stroke and a subsidiary peak which occurs at approximately the end of the exhaust stroke due to inertia effects, and each of the cams 20 is so timed in relation to the peak loads on the bearing to which its associated pump 19 delivers oil that the delivery strokes of the plunger occur during the periods represented by not more than 180° of crankshaft rotation in advance of the peaks, that is to say for example over say about 90° of crankshaft rotation when the pistons are performing intermediate parts of their compression and exhaust strokes. The precise moment when a peak occurs depends upon the speed and other factors of the engine but there is normally a peak at approximately the end of the compression stroke due to the compression and combustion, which latter is independently and normally initiated appreciably before the end of the compression stroke in modern engines.

Figure 4:
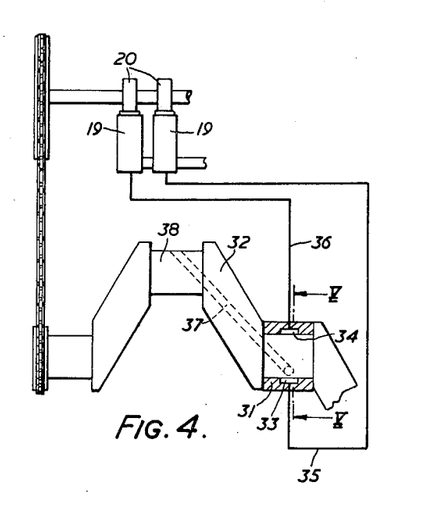
FIGURE 4 is a diagrammatic side elevation showing another example of how the invention may be applied to a reciprocating internal-combustion engine.
Figure 5:
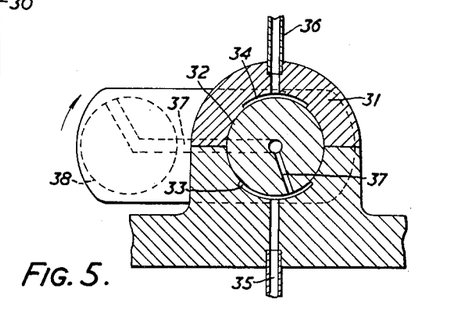
FIGURE 5 is a diagrammatic cross section on the line V—V of FIGURE 4 on an enlarged scale.

In an alternative arrangement according to the invention diagrammatically shown in FIGURES 4 and 5 the main bearing 31 for the crankshaft 32 of a four stroke internal combustion engine contains two arcuate oil grooves 33 and 34 communicating respectively with the two oil discharge passages 35, 36 of reciprocating plungers pumps each similar to one of the pumps 19 and arranged to receive oil under a substantially constant oil pressure from a passage corresponding to the passage 15 in FIGURE 2. The pumps in FIGURE 4 are operated at half crankshaft speed by positive transmission gearing indicated and so that whereas one pump delivers its slug of oil to the groove 33 during a period immediately preceding the onset of peak load at the end of the compression stroke the other delivers its slug of oil to the groove 34 during the period immediately preceding the onset of peak load at the end of the exhaust stroke.

Formed in the crankshaft in known manner is an oil transfer passage 37 leading to the crank pin 38 for lubrication of the big end bearing. It will thus be apparent that during each load cycle represented by two revolutions of the crankshaft, one of the pumps 19 will deliver a slug of oil through the groove passage 35, the groove 33 and the passage 37 to the big end bearing during the compression stroke while the other pump 19 will deliver a slug of oil through the passage 36 to the groove 34 during the exhaust stroke.

As mentioned, the best period for delivery of the slug of oil will differ widely with bearings having different polar load diagrams and each case should be considered in relation to its polar load diagram and the appropriate period then determined in accordance with the general information given above. Moreover it has been found by experiment that in some cases allowances must be made to accommodate time lags in the system due to compression of the oil and other sources of elasticity and/or damping. For example it has been found that owing to these factors for engines with crankshaft speeds of the order of 500 to 1000 revolutions per minute injection of each slug should begin at the pump prior to the correct moment required at the bearing by about 20° to 40° of rotation while in engines with crankshaft speeds of the order of 4000 to 5000 revolutions per minute injection of each slug might be as much as 90° in advance of the theoretically correct moment. Moreover a finite interval of time is required for the injection of each slug of oil and it is important that the slug of oil should fill the clearance space of the bearing before the bearing and shaft have accelerated towards one another under the action of the peak load.

Figure 6:
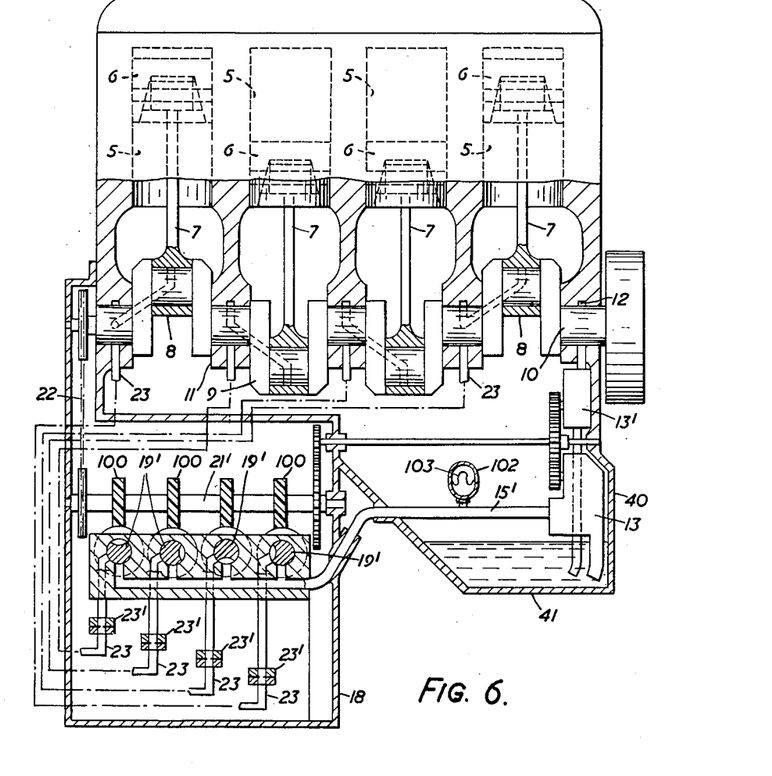
FIGURE 6 is a diagrammatic view of a four cylinder internal combustion engine incorporating a second example of the invention.

In FIGURE 6 the invention, as shown, is as applied to an internal combustion engine similar to that shown in FIGURE 2 and in both figures the same numerals have been used to indicate corresponding parts. In the example shown in FIGURE 6 the slugs of oil are delivered to the different bearing groups by injection by a high pressure oil supply passage 15'. Oil is supplied to this passage from the sump 41 by a high pressure pump 13 of the continuous delivery displacement type, for example of the gear wheel type, and is delivered to the inlets of four distributor valves 19' which are arranged within a casing 18. The valves 19' as shown are rotary valves but they could be of another type.

By a continuous delivery displacement pump is meant a pump which, in each cycle of operation, e.g. each rotation of its main rotary member, delivers a predetermined volume of oil to the oil supply passage 15'.

Each valve 19' is connected to be driven through a helical gearing 100 from a shaft 21' positively driven at crank shaft speed by a chain drive 22 from the crank shaft 10 and arranged to control communication between the supply passage 15' and an associated delivery passage 23 leading to the appropriate bearing group. Each valve is timed to open for the required period in the load cycle of its associated bearing group to permit oil to flow from the supply passage 15' to that bearing group and each delivery passage has therein a restrictor 23'. The restrictors 23' are so dimensioned as to control the proportion of the total delivery of the pump 13 which is delivered in the form of "slugs," respectively, to the various bearing groups.

A hydraulic accumulator 102 having a rising pressure characteristic is connected to the supply passage 15'. This accumulator is of the known kind comprising a closed hollow cylinder which has a quantity of gas sealed at one end by a flexible diaphragm 103 extending between its interior walls and which has its other end connected through a conduit to the supply passage 15'.

A continuous supply of oil is provided to the main bearing 12 from a second pump 13' driven by the engine.

It will be apparent that the volumetric rate of delivery of oil to the supply passage 15' by the pump 13 is proportional to the speed of the engine and that apart, therefore, from any momentary small difference which may occur due to the presence of the accumulator 102, 103, upon a change of speed, the same amount of oil must be delivered to the bearings as a whole per cycle of operation of the engine whatever its speed. Thus after a very short period of running at any particular speed, the pressure in the supply passage must become exactly that necessary for the amount of oil delivered to the bearing groups per cycle to be equal to the amount of oil delivered per cycle into the supply passage by the pump 13. At the same time the proportion of the total volume of oil delivered by the pump 13 which is delivered to each bearing group is determined by the relative sizes of the restrictor orifices and durations of the opening of the valves 19', while the period of the load cycle during which a "slug" of oil is delivered to each bearing group is determined by the timing of the opening periods of the valves 19'.

It will thus be seen that by driving the pump 13 at a speed such that it delivers a volume of oil per engine cycle representing the sum of the volumes of the "slugs" required for all the bearing groups fed by the valves 19' and by timing the valves 19' appropriately and making the restrictor orifices 23' of appropriate diameters, the delivery of a slug of the correct determined volume to each bearing group at the required determined period of the load cycle of that group can be assured.

Figures 7, 8:
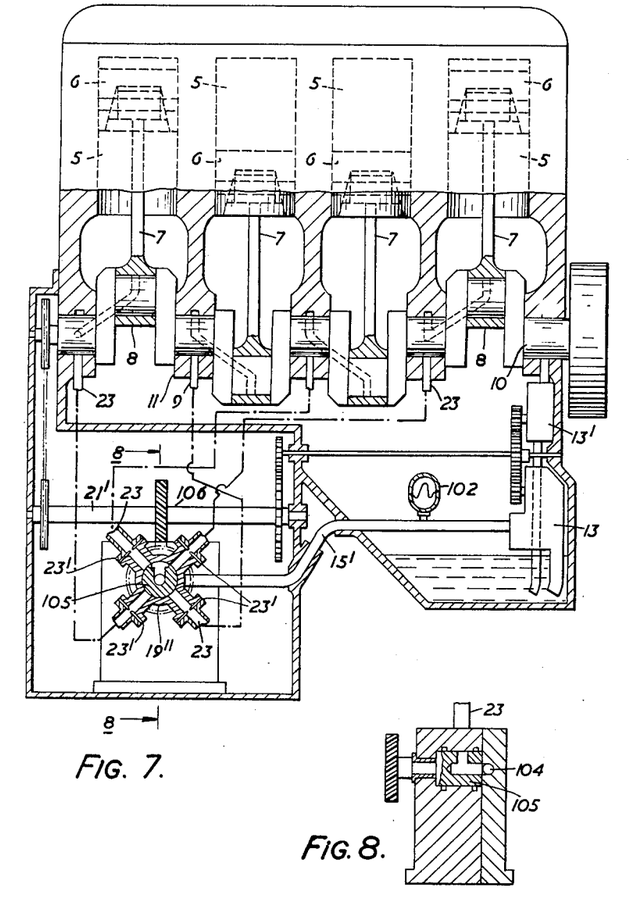
FIGURE 7 is a diagrammatic view of a modification of the embodiment of FIGURE 6.
FIGURE 8 is a cross-section through the distributor on line 8—8 of FIGURE 7.

In the modification shown in FIGURES 7 and 8 the arrangement and operation is generally similar to that of the construction described above with reference to FIGURE 6 except that the four rotary valves 19' are replaced by a single rotary distributor valve 19" having a single inlet 104 to receive oil from the supply passage 15'. The valve rotor 105, which is rotatably driven from the shaft 21' by single helical gearing 106, is arranged to distribute the oil from the inlet 104 to each of four outlets from the valve body, in turn, for supply to the four bearing groups through associated delivery passages 23, each delivery passage, as before, including a restrictor 23' to determine the proportion of oil delivered to the bearing group.

Figure 9:
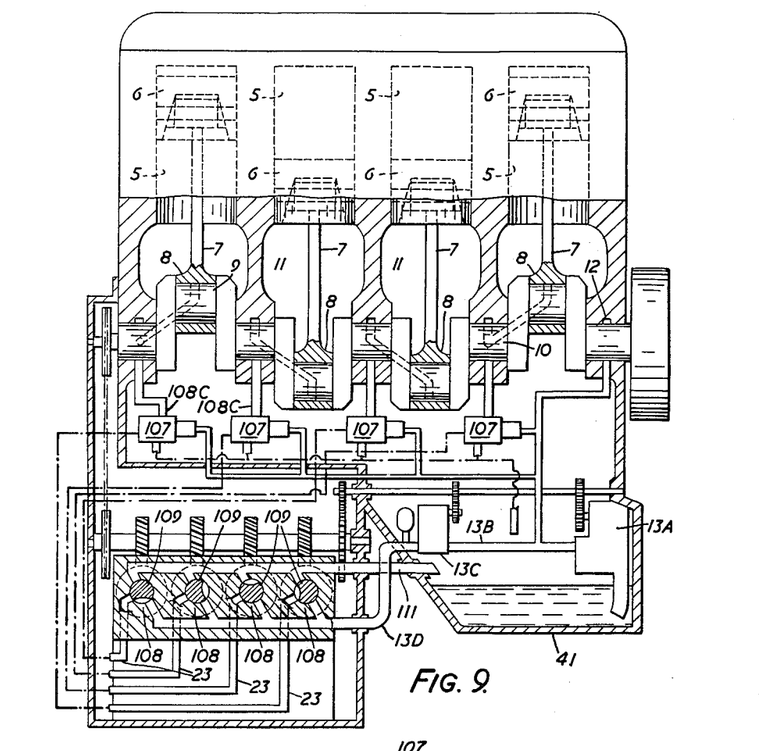
FIGURE 9 is a diagrammatic view of a four cylinder internal combustion engine incorporating a further example of the invention.

In the alternative arrangement shown in FIGURE 9, each bearing group is supplied with "slugs" of oil from an associated oil displacement unit 107.

In this arrangement the low pressure oil pump 13A is provided for the supply of oil to a low pressure supply passage 13B which amongst other things supplies the main bearing 12 and other points where the supply of oil in the form of slugs is not required. A second pump 13C is also provided and arranged to receive oil from the low pressure supply passage 13B to deliver oil at high pressure through a high pressure supply passage 13D connected to the inlets of four rotary valves 108, the rotors 109 of which are driven by the engine in a manner similar to that of the valves 19' of FIGURE 6. The rotor of each of the valves 109 however, is arranged during a predetermined period in each complete rotation to permit oil to flow from the high pressure supply passage 13D into the associated delivery passage 23 and then for an immediately following period (the vent period) to connect the delivery passage 23 to a relief pipe 111 venting into the sump 41.

Each valve 109 connects the high pressure supply passage 13D to its associated delivery passage 23 during that period in the load cycle of an associated bearing group when a "slug" of oil is to be delivered to a bearing group. In this construction, however, the oil from the high pressure supply is not supplied, as in the constructions shown in FIGURE 6 and FIGURE 7, directly to the bearing group but is used to actuate the displacement unit 107 associated with that group.

Figure 10:
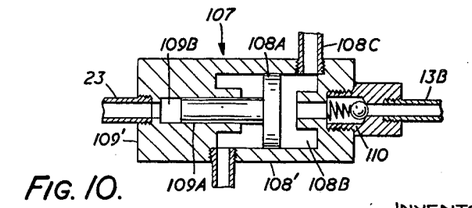
FIGURE 10 is a diagrammatic cross-sectional view of a displacement employed in the example shown in FIGURE 9.

Each displacement unit, as shown in FIGURE 10, comprises two coaxial cylinders 108', 109' and a piston member comprising two pistons 108A and 109A directly coupled to one another. The piston 108A constitutes an oil delivery piston while the piston 109A constitutes a hydraulic actuating piston by which movement of the piston 108A to deliver slugs of oil is effected. The working chamber 108B of the cylinder 108' is connected to the low pressure oil supply passage 13B via a non-return valve 110 having a light spring and is continuously in communication with a delivery passage 108C leading to the appropriate bearing group. The working chamber 109B of the cylinder 109' communicates continuously with the passage 23 coupled to the appropriate one of the valves 109. The operation of each of the displacement units is as follows. During the "vent period" of each valve the working chamber 109B is vented into the sump 41, and oil from the low pressure supply passage 13B passes through the non-return valve 110 into the working chamber 108B to force the piston to the left-hand end (as shown in FIGURE 10) of the cylinder 108. When the valve 109 then passes into the position permitting high pressure oil to flow into the discharge passage 23, the high pressure oil enters the chamber 109B and forces the piston 108A to the right-hand end of its cylinder and so pump a slug of oil of predetermined value through the delivery passage 108C leading to the associated bearing group. In this construction, therefore, the timing of delivery of the "slugs" is determined by the timing of the valves 109 but the volume of each slug is determined by the stroke and diameter of the piston 108A.

Figure 11:
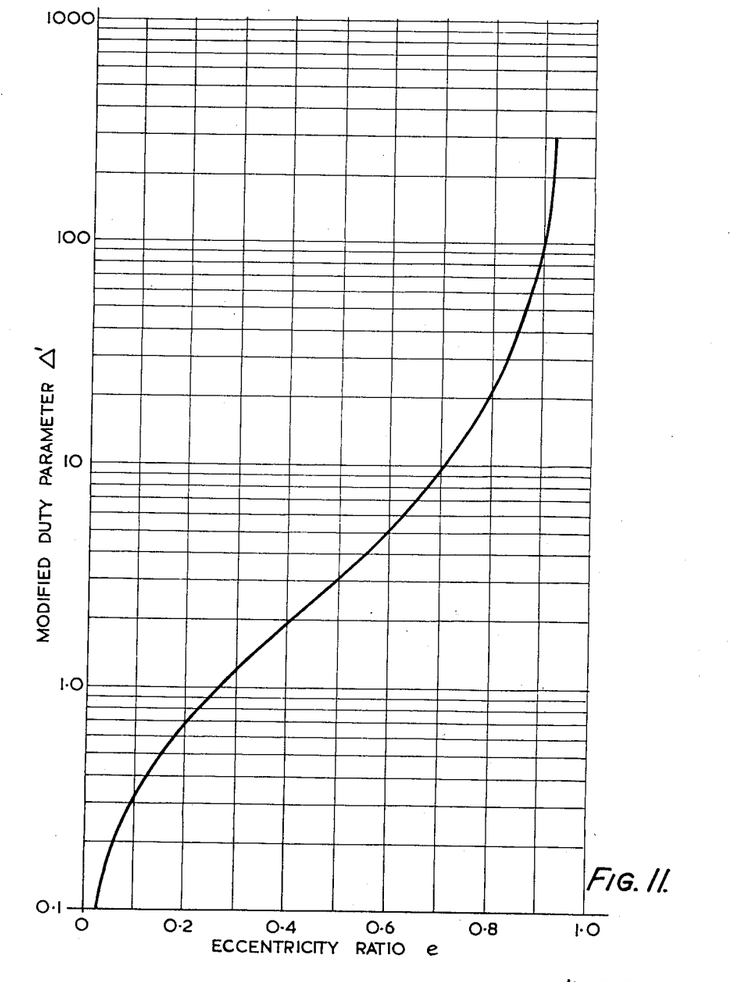

In order further to indicate how the correct volume for each slug should be determined in accordance with indications given above reference is now made to FIGURE 11.

The eccentricity ratio can be obtained graphically from the modified so-called duty parameter which is derived from the known peak load, the speed of the engine, dimensions of the bearing, and the viscosity of the oil to be used. A conversion graph between the duty parameter and the eccentricity ratio is attached as FIGURE 11, and a calculation of the eccentricity ratio for one particular bearing is given below by way of example.

Peak load $W=33,000$ lbs. at $15°$ after T.D.C.
Length of bearing $b=4''$
Diameter of bearing $d=6''$
Diametral clearance $c=0.008''$
Engine speed $N=800$ r.p.m.
Oil viscosity $\eta=20$ centipoises
Modified duty parameter $\Delta'$
(from Burke and Neale's design procedure cited above)

$$=\frac{1.31C^2W}{b^3dN\eta}\times 10^8$$

for units in inches, pounds, r.p.m., and centipoises.

$$\Delta'=\frac{1.31\times 0.008^2\times 33000}{4^3\times 6\times 800\times 20}\times 10^8$$

From graph FIGURE 11, eccentricity ratio $e=0.85$.

In order further also to indicate how both the volume and the appropriate period or periods in a load cycle for the injection of the slug or slugs can be determined, reference will now be made to FIGURES 12, 13 and 14 which show typical polar load diagrams.

Figure 12:
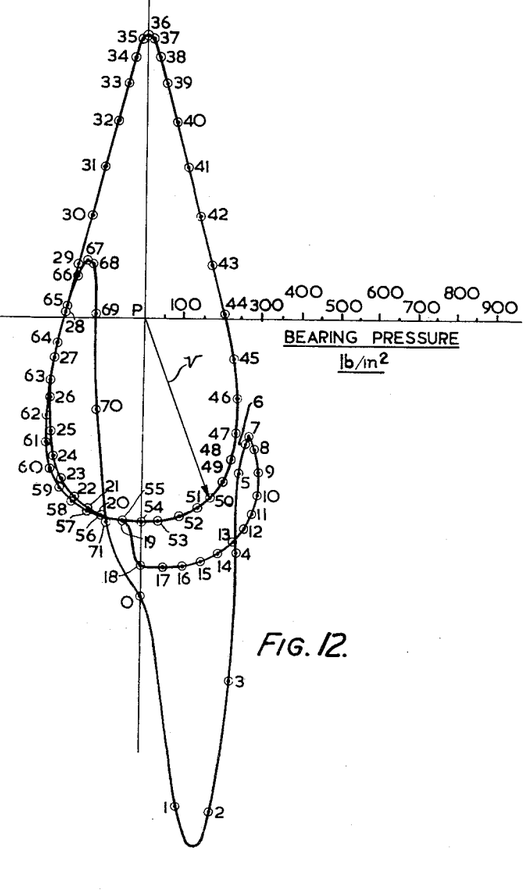

The polar load diagram shown in FIGURE 12 is that of the bearing of which particulars are given above and is typical of the big end bearing of the connecting rod of a four-stroke diesel engine which may be assumed to be that shown in FIGURES 2 and 3. Any vector $v$ of the load diagram gives by its scaled length the magnitude of the load applied by the connecting rod to the crank pin at a point in the cycle. The direction of application of the load is shown relative to a convenient datum axis, usually the axis of the engine cylinder. The numbers 0, 1, 2, 3, ... 69, 70, 71, indicate the rotational position of the crank at which loads are computed. In this case the increments are $10°$ crank rotation and position 0 is T.D.C. (top dead center) firing. Hence the particular vector $v$ represents the resultant load when the crank is $140°$ after T.D.C. on the induction stroke, since the load cycle extends for two complete revolutions of the crankshaft.

By inspection it will be seen that the angular velocity of the load vector in the direction of rotation of the shaft begins to reduce at point 66 and continues reducing through zero speed to a maximum negative velocity at about point 70, that is during $40°$ of the shaft rotation. Thus $$\alpha=\frac{40}{57}\text{ radians}=0.7\text{ radians}$$

The slug of oil $V$ preferred is therefore $=b.d.c.$ $e.k.=4\times 6\times 0.008\times 0.85\times 0.84$ cubic inch $=0.136$ cubic inch.

It is advisable to allow for wear in the bearing and this should be taken as the direct ratio of the clearance as worn to the designed clearance. This will vary from engine to engine and with variation in operating conditions; thus the figure may be increased by 50% to 100% or more.

Referring now to FIGURE 12 the timing of the injection at the bearing should begin at about point 63 and end at about point 70.

While in many cases it will not be essential to inject any further oil slug during the load cycle in the given FIGURE 12 it may be advantageous to inject a determined volume of oil (which will be less than the volume of the oil slug referred to above), between the points 30 and 36, that is to say during reduction of angular velocity of the load vector in the direction of rotation of the shaft and prior to the subsidiary peak load at point 36. During this period from 30 to 36 the big end bearing will resist the injection of oil to a greater extent than during the period 63 to 70. Since oil is supplied to the big end bearing in series with the associated main bearing, the main bearing will get a preferential oil supply during the period 30 to 36.

It will be understood that the form of the cams 20 can readily be modified to provide for delivery of one or more "slugs" of oil at the selected period or periods in the load cycle.

Figure 13:
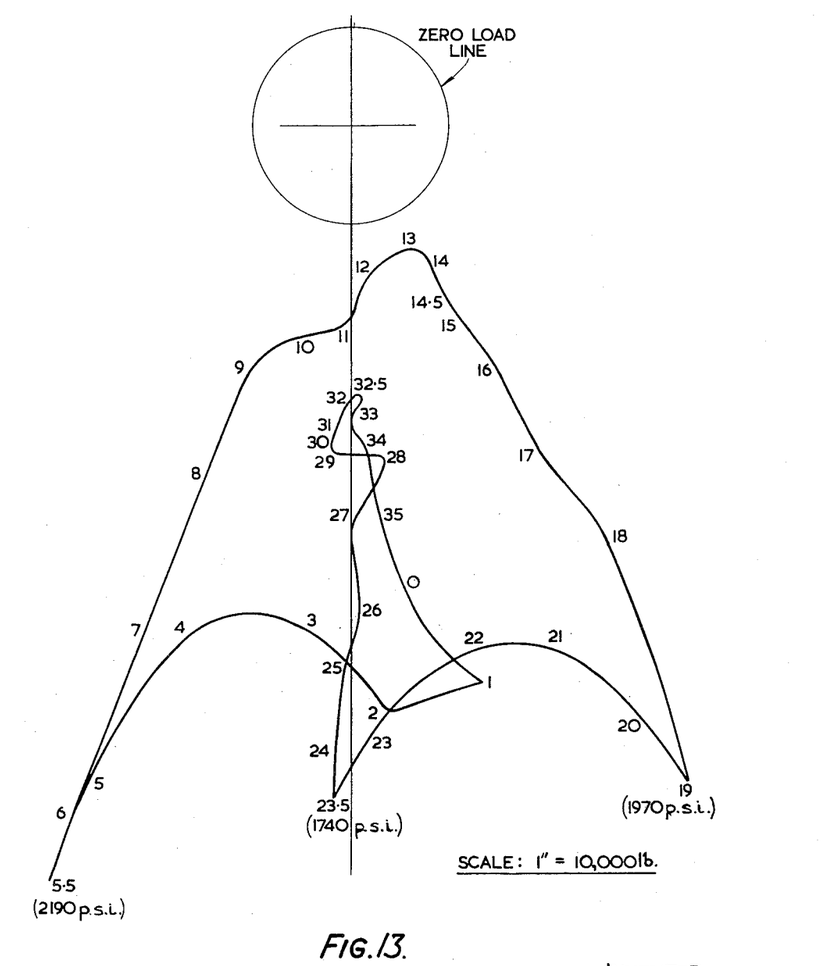

FIGURE 13 is a typical polar load in which the injection of two slugs per load cycle may be desirable in view of the multi lobed nature of the polar load diagram for a main bearing of a V engine. In this case the points referenced 0 to 35 represent $20°$ intervals of rotation of the crankshaft and there are two salient lobes or peak loads at 5.5 and 19. The salient at 23.5 is a combination of residual gas load from the left hand bank plus combined inertial effect from both banks. In this case it would be advantageous to inject oil slugs during the periods from 10-14 and from 33 through 0 to 1.

Figure 14:
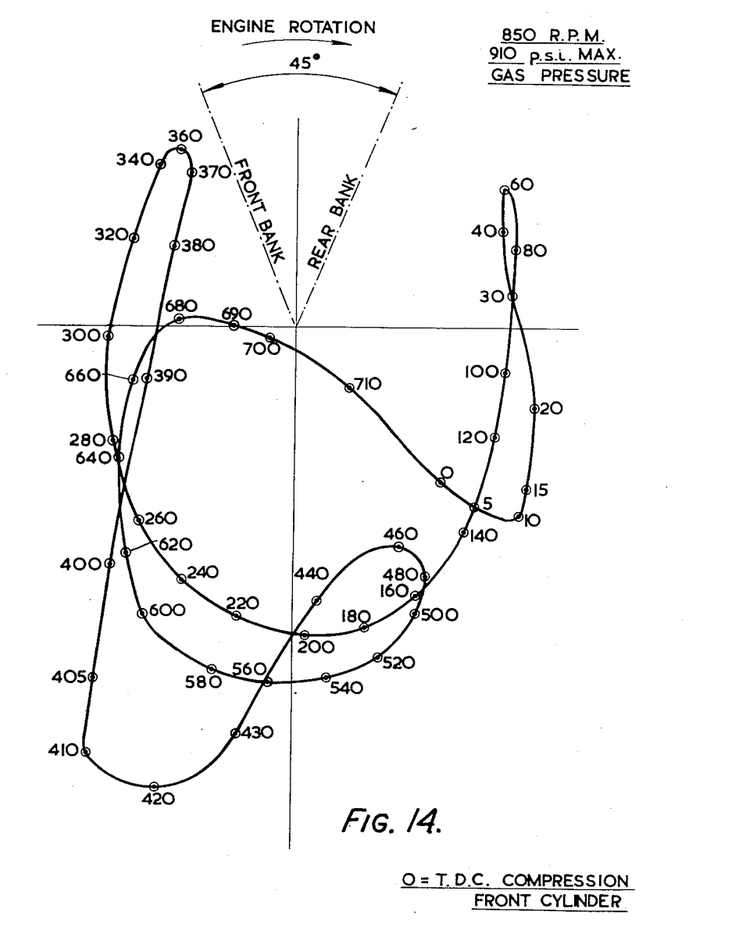

FIGURE 14 is another typical polar load diagram on which points are marked off according to degrees of crankshaft rotation from 0 to $720°$. A salient lobe or peak load occurs in the region of $405°$ to $430°$ and in this case the best period during which to inject the oil slug is from about $340°$ to $390°$. During the second revolution of the load cycle oil will be injected at $680°$ through zero to $60°$ in anticipation of the sustained load which occurs from about $120°$ to $280°$.

In all cases the best period during which to inject the oil slug can be determined or checked experimentally on a dynamically similar model using a transparent bearing rotating at a relatively slow speed. Direct visual observation through the transparent bearing of the oil film may be adequate for these purposes or alternatively a cinephotographic record may be made and studied frame by frame.

Where bearings are grouped it is desirable to study their polar diagrams separately, to derive the amounts and timing of the slugs required for each bearing in the group and to add these on a time base in order to design the shape of the cam of the oil pump or of the variable orifice of the distributor for the group as the case may be.

It will be appreciated therefore that to obtain the advantages of the present invention it is essential to time the injection of the oil slug to each bearing in such a way that the clearance space which is subject to the maximum load will be substantially filled prior to the imposition of the maximum load. It is not sufficient merely to time the oil supply to coincide with the instant of peak load. It is equally important that the volume of each oil slug should be determined to ensure that the required amount of oil is injected to fill the clearance space.

What I claim as my invention and desire to secure by Letters Patent is:

1. In a machine having a rotatable shaft and a plain bearing cooperative therewith and wherein said bearing is subjected to a cyclic load, lubricating apparatus therefor comprising a source of oil, an oil pump, a conduit between said source of oil and the pump inlet, a second conduit between the outlet of said pump and said bearing, and control means forming part of said second conduit, said control means being external to said bearing and shaft for delivering an oil slug of a predetermined value to said bearing at at least one fractional period of the complete load cycle, said period beginning prior to onset of a loading condition conducive to a decrease in oil film thickness between said shaft and bearing.

2. Lubricating apparatus for a machine as defined in claim 1 wherein said control means for delivering oil slugs to said bearing includes an auxiliary reciprocating oil pump of the positive displacement piston type connected into said second conduit, and means driving said auxiliary oil pump at a speed proportional to the rotational speed of the machine shaft.

3. Lubricating apparatus for a machine as defined in claim 1 wherein said control means for delivering oil slugs is so timed in relation to the load cycle of said bearing as to start delivery of an oil slug while said shaft is rotating within said bearing through 90° prior to a reduction of the angular velocity of the load vector in the direction of rotation of said shaft relatively to said bearing and to continue delivery of said slug until the angular velocity of the load vector in the direction of rotation of said shaft relatively to said bearing at least begins to rise.

4. Lubricating apparatus for a machine as defined in claim 3 wherein delivery of said oil slug is continued until the onset of a peak load.

5. Lubricating apparatus for a machine as defined in claim 1 wherein said control means for delivering oil slugs is so timed in relation to said load cycle as to deliver each oil slug during a period which does not exceed 180° of rotation of said shaft in advance of the onset of the peak load.

6. Lubricating apparatus for a machine as defined in claim 1 wherein said control means for delivering oil slugs is so timed in relation to said load cycle that each oil slug is delivered during a period beginning during a period not exceeding 90° of rotation of said shaft prior to a reduction in angular velocity of the load vector in the direction of rotation of said shaft in said bearing and ending during a period not exceeding 120° of rotation of said shaft after the onset of said reduction in angular velocity.

7. Lubricating apparatus for a machine as defined in claim 1 wherein said oil slugs are delivered at high pressure and said oil pump delivers oil to said bearing through said second conduit at a relatively low constant pressure during at least a part of the period in said load cycle when high pressure oil slugs are not being delivered.

8. Lubricating apparatus for a machine as defined in claim 1 wherein said second conduit includes a non-return valve through which oil is delivered to said bearing at a relatively low constant pressure during at least a part of the period in said load cycle when oil slugs are not being delivered, and said control means deliver said oil slugs at high pressure and are located in said second conduit between the outlet side of said non-return valve and said bearing.

9. Lubricating apparatus for a machine as defined in claim 8 wherein said control means for delivering said oil slugs comprises an auxiliary oil pump.

10. Lubricating apparatus for a machine as defined in claim 9 wherein said auxiliary oil pump is of the positive displacement piston type, and which further includes means driving said auxiliary pump at a speed proportional to the rotational speed of said machine shaft.

11. Lubricating apparatus for a machine as defined in claim 1 wherein the volume V of each said oil slug is determined by the formula $$V = b \cdot d \cdot c \cdot e \cdot k$$

where:

$b$ is the length of said bearing
$d$ is the diameter of the bore of said bearing
$c$ is the difference between the diameter of said bearing bore and the diameter of the shaft therein
$e$ is the eccentricity ratio of the shaft within said bearing at a steady load, and
$k$ is a duration factor.

12. Lubricating apparatus for a machine as defined in claim 1 wherein said machine includes at least two bearings interconnected by an oil passageway, said bearings constituting a group in which fluctuating loads are transmitted between the bearings of said group and wherein said oil slugs are delivered simultaneously to the bearings of said group.

13. In a reciprocating engine which includes a crankshaft, at least one plain main bearing having at least one oil supply passage therein and supporting said crankshaft, at least one piston, a connecting rod, and connecting rod bearings connecting the connecting rod respectively to the piston and the crankshaft, lubricating apparatus therefore comprising a source of oil, an oil pump, a conduit between said source of oil and the pump inlet, a second conduit between the outlet of said pump and said oil supply passage in said main bearing, auxiliary reciprocating oil pump means of the positive displacement piston type connected into said second conduit for delivering oil slugs of a predetermined value to said oil supply passage in said main bearing at at least one fractional period of the complete load cycle of said main bearing, said period beginning prior to onset of a loading condition conducive to a decrease in oil film thickness between said crankshaft and said main bearing, and means driving said auxiliary oil pump means at a speed proportional to the rotational speed of said crank shaft.

14. Lubricating apparatus for a reciprocating engine as defined in claim 13 wherein said auxiliary oil pump means delivers an oil slug at each of two fractional periods of said complete load cycle of said main bearing.

15. Lubricating apparatus for a reciprocating engine as defined in claim 13 wherein said main bearing is provided with two oil supply passages angularly spaced apart around it and said auxiliary reciprocating oil pump means comprises two such pumps, each such auxiliary pump delivering one oil slug per load cycle of said main bearing to a corresponding one of said oil supply passages, one of said oil supply passages communicating during the period of delivery of each oil slug therethrough with said connecting rod bearing by which the connecting rod is connected to said crankshaft.

16. Lubricating apparatus for a reciprocating engine as defined in claim 13 wherein said engine operates on a four-stroke load cycle and includes a passage in said crankshaft leading from said main bearing to the connecting rod bearing by which said connecting rod is connected to said crankshaft, and wherein said auxiliary reciprocating oil pump means delivers two oil slugs per cycle to said main bearing, and wherein at least one of said bearings functions as a distributing valve body by which one of said two oil slugs for a given cycle is delivered to said main bearing without any substantial portion thereof passing to said connecting rod bearing, while the other oil slug of that cycle is delivered through said passage in said crankshaft to said connecting rod bearing without any substantial portion thereof entering the clearance space of said main bearing.

17. In a machine having a rotatable shaft and a plain bearing cooperative therewith and wherein said bearing is subjected to a cyclic load, lubricating apparatus therefor comprising a source of oil, a low pressure oil pump of the continuous delivery type, a conduit between said source of oil and the pump inlet, a second conduit between the outlet of said pump and said bearing, a reciprocating pump of the positive displacement piston type interposed in said second conduit and external to said bearing and shaft, the cylinder of said reciprocating pump including an inlet port connecting into said second conduit to receive oil from said continuous delivery pump and a continuously open delivery port connected into said second conduit to deliver oil to said bearing, a non-return valve in said second conduit adjacent said inlet port to said reciprocating pump, said non-return valve being openable in the direction of oil flow through said second conduit and normally held in an open position by the oil pressure from said continuous delivery pump, and means for reciprocating said piston of said reciprocating pump at a speed proportional to the rotational speed of said shaft to effect periodic closures of said non-return valve and hence of said inlet port and periodic delivery of higher pressure oil slugs of a predetermined value from said pump cylinder through said delivery port and through said second conduit to said bearing, said higher pressure oil slugs being delivered at at least one fractional period of the complete load cycle, said period beginning prior to onset of a loading condition conductive to a decrease in oil film thickness between said shaft and bearing.

18. Lubricating apparatus for a machine as defined in claim 17 wherein the volume V of each said oil slug is determined by the formula $$V = b \cdot d \cdot c \cdot e \cdot k$$

where:

$b$ is the length of said bearing
$d$ is the diameter of the bore of said bearing
$c$ is the difference between the diameter of said bearing bore and the diameter of the shaft therein
$e$ is the eccentricity ratio of the shaft within said bearing at a steady load, and
$k$ is a duration factor.

19. Lubricating apparatus for a machine as defined in claim 17 wherein the volume of each said oil slug is not less than $0.4 \ b \cdot d \cdot c$ wherein:

$b$ is the length of said bearing
$d$ is the diameter of the bore of said bearing, and
$c$ is the difference between the diameter of said bearing bore and the diameter of said shaft therein.

20. In a machine having a rotatable shaft and a plain bearing cooperative therewith and wherein said bearing is subject to a cyclic load, lubricating apparatus therefor comprising a source of oil, an oil pump of the continuous delivery displacement type, means driving said pump at a speed proportional to the rotational speed of said shaft, a conduit between said source of oil and the pump inlet, a second conduit between the outlet of said pump and said bearing, a control valve device external to said bearing and shaft and interposed in said second conduit for controlling flow of oil therethrough to said bearing and means for operating said valve device periodically between an open and closed positions at a speed proportional to the rotational speed of said shaft to effect periodic delivery of oil slugs of a predetermined value to said bearing, said periodic delivery of oil slugs being so correlated to the load cycle of said bearing that an oil slug is delivered at at least one fractional period of the complete load cycle, said period beginning prior to onset of a loading condition conducive to a decrease in oil film thickness between said shaft and bearing.

21. Lubricating apparatus for a machine as defined in claim 20 and which further includes a hydraulic accumulator in said second conduit between said pump and said control valve device.

22. Lubricating apparatus for a machine as defined in claim 20 wherein said machine shaft has at least two plain bearings cooperative therewith subject respectively to load cycles out of phase with each other and wherein separate control valve devices are provided for effecting periodic delivery of oil slugs to their respectively associated bearings during periods which are separated from one another by an interval equivalent to the interval by which the load cycles of said bearings are out of phase.

23. Lubricating apparatus for a machine as defined in claim 22 and which further includes an oil flow restricting device interposed in the conduit between one of said control valve devices and the bearing associated therewith for controlling the proportion of the total oil delivery from said pump which passes through said conduit.

24. In a machine having a rotatable shaft and a plurality of plain bearings cooperative therewith and wherein said bearings are subject respectively to load cycles, lubricating apparatus therefor comprising a source of oil, an oil pump of the continuous delivery displacement type, means driving said pump at a speed proportional to the rotational speed of said shaft, a conduit between said source of oil and the pump inlet, a distributing valve having an inlet thereto and an outlet for each of said plain bearings, a second conduit between the outlet from said pump and the inlet to said distributing valve, other conduits connected respectively between the outlets from said distributing valve and the corresponding plain bearings for delivering oil slugs of a predetermined value to said plain bearings, and means for operating said distributing valve at a speed such that it performs one cycle for each load cycle of each of said plain bearings, said distributing valve serving to connect each of the outlets therefrom with the inlet thereto at a different part of the cycle of operation of said distributing valve.

25. Lubricating apparatus for a machine as defined in claim 24 and which further includes a hydraulic accumulator interposed in said second conduit.

26. Lubricating apparatus for at least one plain bearing which is subject to a cyclic fluctuating load in a machine, comprising a hydraulically operated displacement pump device including a delivering piston and cylinder assembly which during each cycle of operation delivers an oil slug of a determined value through a delivery passage to a plain bearing, and an operating piston and cylinder assembly causing the delivery piston to perform its delivery stroke when operating fluid under pressure is delivered to the working chamber of said operating piston and cylinder assembly, valve means controlling the delivery of operating fluid under pressure to and release of working fluid from said working chamber of said operating piston and cylinder assembly and driving means driving said valve means at a speed corresponding to that of the load cycle of the said bearing.

27. Lubricating apparatus as claimed in claim 26 including a high pressure constant delivery pump supplying operating fluid to an operating fluid supply passage, communication between said operating fluid supply passage and said working chamber of said operating piston and cylinder assembly being controlled by said valve means, and further including constant delivery pump means for delivering oil at a low pressure to a low pressure oil supply passage, said low pressure oil supply passage being connected to the inlet passage of the working chamber of said delivery piston and cylinder assembly and said inlet passage including an automatic non-return valve while said working piston and cylinder assembly includes a delivery passage leading to the said bearing in open communication with the working chamber of said delivering piston and cylinder assembly.

28. Lubricating apparatus for at least two plain bearings as claimed in claim 27 wherein each plain bearing has associated with it a hydraulically operated displacement pump device, and valve apparatus controlling the supply of operating fluid under pressure to and the release of operative fluid from the working chamber of its associated operating piston and cylinder assembly, the load cycles of the two bearings being out of phase and the periods when the operating fluid supply passage is connected respectively to the working chambers of the respective hydraulically operated displacement pump devices being correspondingly out of phase.

References Cited in the file of this patent

UNITED STATES PATENTS

| | | |
|---|---|---|
| 1,077,823 | Farnam | Nov. 4, 1913 |
| 1,497,009 | Bull | June 10, 1924 |
| 1,947,023 | Shoemaker | Feb. 13, 1934 |
| 2,038,287 | Hawks et al. | Apr. 21, 1936 |
| 2,822,222 | Love | Feb. 4, 1958 |